(12) United States Patent
Wu et al.

(10) Patent No.: US 12,045,078 B1
(45) Date of Patent: Jul. 23, 2024

(54) ELASTIC BLOCK LIMITING MECHANISM

(71) Applicant: AAC Microtech (Changzhou) Co., Ltd., Jiangsu (CN)

(72) Inventors: Jinguo Wu, Changzhou (CN); Xianshuang Zhu, Changzhou (CN); Feng Yan, Changzhou (CN); Sensen Yang, Changzhou (CN); Jing Fan, Changzhou (CN); Quanbao Xia, Changzhou (CN); Junxiang Han, Changzhou (CN)

(73) Assignee: AAC MICROTECH (CHANGZHOU) CO., LTD., Changzhou (CN)

( * ) Notice: Subject to any disclaimer, the term of this patent is extended or adjusted under 35 U.S.C. 154(b) by 0 days.

(21) Appl. No.: 18/313,397

(22) Filed: May 8, 2023

Related U.S. Application Data

(63) Continuation of application No. PCT/CN2023/081022, filed on Mar. 13, 2023.

(30) Foreign Application Priority Data

Feb. 8, 2023 (CN) .......................... 202310106976.6

(51) Int. Cl.
G05G 5/04 (2006.01)
(52) U.S. Cl.
CPC ........... *G05G 5/04* (2013.01); *G05G 2505/00* (2013.01)

(58) Field of Classification Search
CPC .. G05G 5/02; G05G 5/04; G05G 5/06; G05G 5/065; G05G 5/08; G05G 2505/00; B25J 19/00
See application file for complete search history.

(56) References Cited

U.S. PATENT DOCUMENTS

| | | | | |
|---|---|---|---|---|
| 3,012,447 A | * | 12/1961 | Wallace | G05G 5/04 192/139 |
| 4,815,339 A | * | 3/1989 | Bonadies | B23Q 16/001 192/139 |
| 10,817,011 B2 | * | 10/2020 | Fang | F16M 11/06 |
| 2016/0201775 A1 | * | 7/2016 | Gitnes | F16H 25/2015 74/89.37 |

FOREIGN PATENT DOCUMENTS

CN 116066533 A * 5/2023

* cited by examiner

*Primary Examiner* — Adam D Rogers
(74) *Attorney, Agent, or Firm* — W&G Law Group

(57) ABSTRACT

An elastic block limiting mechanism includes: a base, a first elastic limiting assembly, a second elastic limiting assembly, a turntable and a bearing. The first elastic limiting assembly includes a first elastic member and a first elastic block. The second elastic limiting assembly includes a second elastic member and a second elastic block. The turntable includes a ring-shaped turntable body and a shifting lever. The bearing is mounted in a through hole and fixed to the base body, the turntable body being inserted into the bearing and forming a fixation to achieve a rotational connection with the base body. Compared with the related art, the elastic block limiting mechanism of the present disclosure has a simple structure, small space occupation, good stability, effective noise reduction, and high reliability.

9 Claims, 8 Drawing Sheets

ELASTIC BLOCK LIMITING MECHANISM

TECHNICAL FIELD

The present disclosure relates to the technical field of robots, and in particular, to an elastic block limiting mechanism.

BACKGROUND

With the development of science and technology, more and more industries begin to use robots to replace human work. The robots generally realize operating functions by stretching, rotating, moving, and the like. Therefore, operational performance of the robots is closely related to an experience effect.

In the related art, few±180° rotation positioning structures are applied to the field of robots, and most of the structures cannot simultaneously perform rotation positioning on 0° to 180° and 0° to −180°, while rotation positioning structures in other applications adopt complex mechanical limiting such as screw positioning, a follow-up slider, and a bumper to cooperate with electrical limiting and software limiting to protect abnormal rotation of a rotating mechanism.

However, the rotation positioning structures in the related art have many and complex actions, occupy a large space, and have poor compatibility with a robot turntable, most of which only rely on the electrical limiting to achieve limiting of +180° rotation, thereby having potential risks such as failure of electrical components and having low reliability in the application to the robot turntable.

Therefore, there is a need to provide a new elastic block limiting mechanism to solve the above problems.

SUMMARY

The technical problem to be solved in the present disclosure is to provide an elastic block limiting mechanism having a simple structure, small space occupation, good stability, effective noise reduction, and high reliability.

In order to solve the above technical problem, the present disclosure provides an elastic block limiting mechanism for realizing limiting of 180° forward and reverse rotation. The elastic block limiting mechanism includes: a base, a first elastic limiting assembly, a second elastic limiting assembly, a turntable and a bearing. The base comprises a base body and a through hole in a circular shape passing through the base body. The first elastic limiting assembly comprises a first elastic member fixed to one side of the base and extending along a direction parallel to a radial direction of the through hole and a first elastic block fixedly connected to an end of the first elastic member adjacent to the through hole. The first elastic block comprises a first elastic block body, a first guide hole recessed from an end of the first elastic block body away from the through hole, and a first concave structure recessed from one side of the first elastic block body; the other end of the first elastic block body adjacent to the through hole is a first sliding slope. The second elastic limiting assembly is arranged parallel to and spaced apart from the first elastic limiting assembly. The second elastic limiting assembly comprises a second elastic member fixed to one side of the base and extending along a direction parallel to the first elastic member and a second elastic block fixedly connected to an end of the second elastic member adjacent to the through hole; the second elastic block comprises a second elastic block body, a second guide hole recessed from an end of the second elastic block body away from the through hole, and a second concave structure recessed from one side of the second elastic block body, the other end of the second elastic block body adjacent to the through hole is a second sliding slope. The first concave structure and the second concave structure are respectively located on sides of the first elastic block body and the second elastic block body adjacent to each other and arranged opposite to each other. Sides of the first sliding slope and the second sliding slope adjacent to each other is closer to the through hole than sides of the first sliding slope and the second sliding slope away from each other. The turntable comprises a turntable body in a ring shape and a shifting lever protruding from the turntable body. The bearing is mounted in the through hole and fixed to the base body. The turntable body is inserted into and fixed to the bearing to achieve a rotational connection with the base body. The shifting lever rotates clockwise or counterclockwise to the first sliding slope or the second sliding slope until abuts against the first elastic block body or the second elastic block body so that the shifting lever slides into the second concave structure or the first concave structure to realize snapped limiting.

As an improvement, the base further comprises a first groove in a ring shape and a second groove in a ring shape that are recessed from one side of the base body along an axial direction of the through hole, and a first guide groove and a second guide groove that are recessed from one side of the base body along a radial direction of the through hole; and the turntable body passes through the through hole and forms a rotational connection with the second groove, and the shifting lever is arranged in the first groove.

As an improvement, the first elastic member further comprises a first limiting block protruding from a bottom side of the first elastic block body adjacent to the base; and the second elastic member further comprises a second limiting block protruding from a bottom side of the second elastic block body adjacent to the base; and the first guide groove is inward recessed to form a first limiting stage, the second guide groove is inward recessed to form a second limiting stage, the first limiting block is arranged in contact with the first limiting stage, and the second limiting block is arranged in contact with the second limiting stage.

As an improvement, the shifting lever comprises a shifting lever body protruding from the turntable body and a convex structure extending from an end of the shifting lever body away from the turntable body to two opposite sides and perpendicular to the shifting lever body, and the convex structure is configured to abut against the first sliding slope or the second sliding slope and slide to realize a snapped limiting with the second concave structure or the first concave structure.

As an improvement, two ends of the convex structure are recessed to form a cambered structure, and the cambered structure is in contact with the first sliding slope or the second sliding slope to convert rotational motion into linear motion.

As an improvement, the first sliding slope, the second sliding slope, and the cambered structure are formed by surface treatment through a coating process.

As an improvement, the first elastic member comprises a first guide post fixed to the base and a first spring sleeved on the first guide post, and the first spring has one end fixed to the base, and the other end inserted and extended into the first guide hole to form a fixed connection.

As an improvement, the second elastic member comprises a second guide post fixed to the base and a second spring sleeved on the second guide post, and the second spring has one end fixed to the base, and the other end inserted and extended into the second guide hole to form a fixed connection.

As an improvement, both the first guide post and the second guide post are screws.

As an improvement, the turntable body penetrates inward to form a middle hole, and the middle hole is configured to mount a wiring harness.

Compared with the related art, in the elastic block limiting mechanism of the present disclosure, the base is provided, the first elastic limiting assembly and the second elastic limiting assembly are installed on the base to limit a rotation position of the turntable, the first elastic block is adjusted by the first elastic member of the first elastic limiting assembly, and the second elastic block is adjusted by the second elastic member of the second elastic limiting assembly. When the turntable rotates forward, the shifting lever slides through the first sliding slope into the second concave structure of the second elastic block to realize engaged limiting, and when the turntable rotates reversely, the shifting lever slides into the first concave structure of the first elastic block through the second sliding slope to realize engaged limiting, so as to realize rotation positioning of 180° forward and reverse rotation. An overall footprint is small, and the spring can effectively restrict a degree of freedom of the elastic block in a non-operating state in a vibration environment, which prevents shaking, effectively reduces noise, and has high reliability.

BRIEF DESCRIPTION OF DRAWINGS

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in the embodiments of the present disclosure will be clearly and completely described below with reference to the accompanying drawings in the embodiments of the present disclosure. Obviously, the described embodiments are only part of instead of all of the embodiments of the present disclosure. Based on the embodiments in the present disclosure, all other embodiments obtained by those of ordinary skill in the art without creative efforts fall within the protection scope of the present disclosure.

Figure 1:
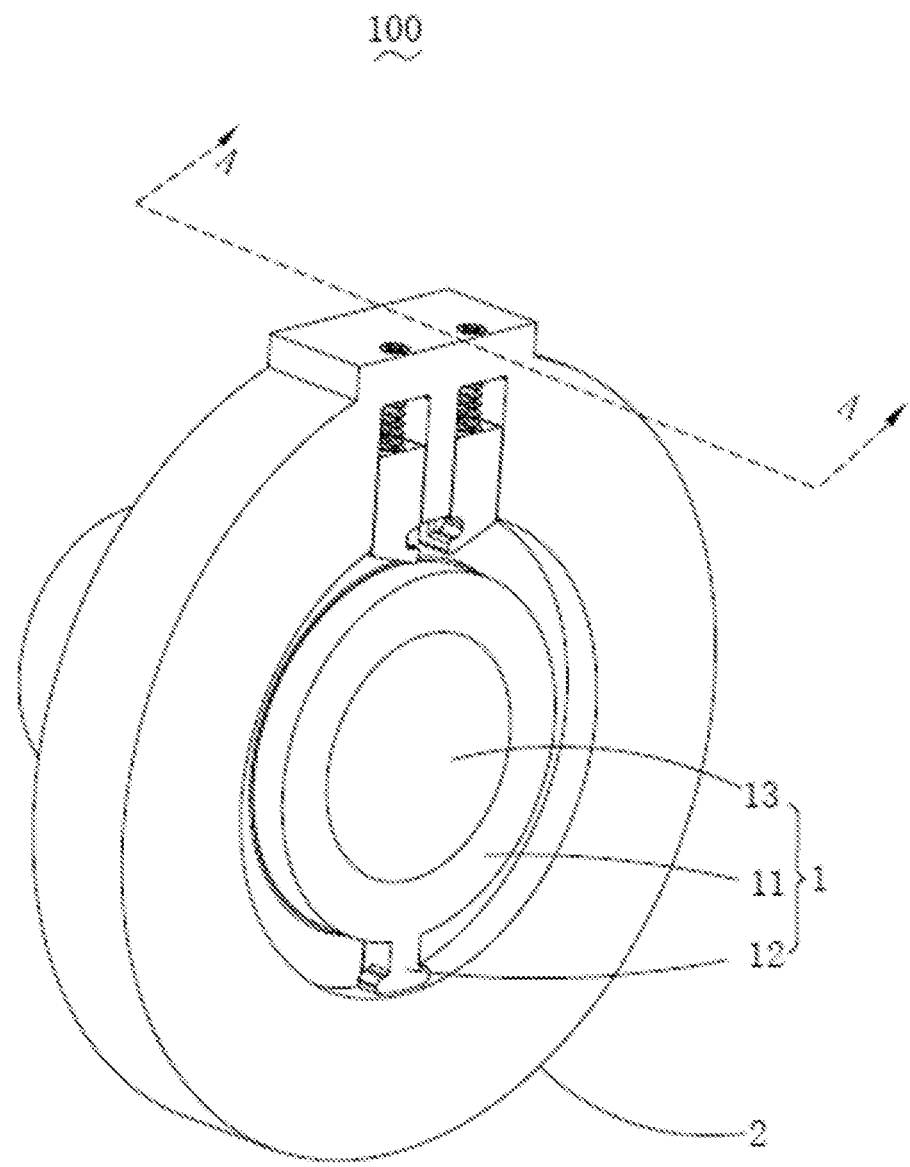
FIG. 1 is a structural schematic diagram of an elastic block limiting mechanism according to the present disclosure.
Figure 2:
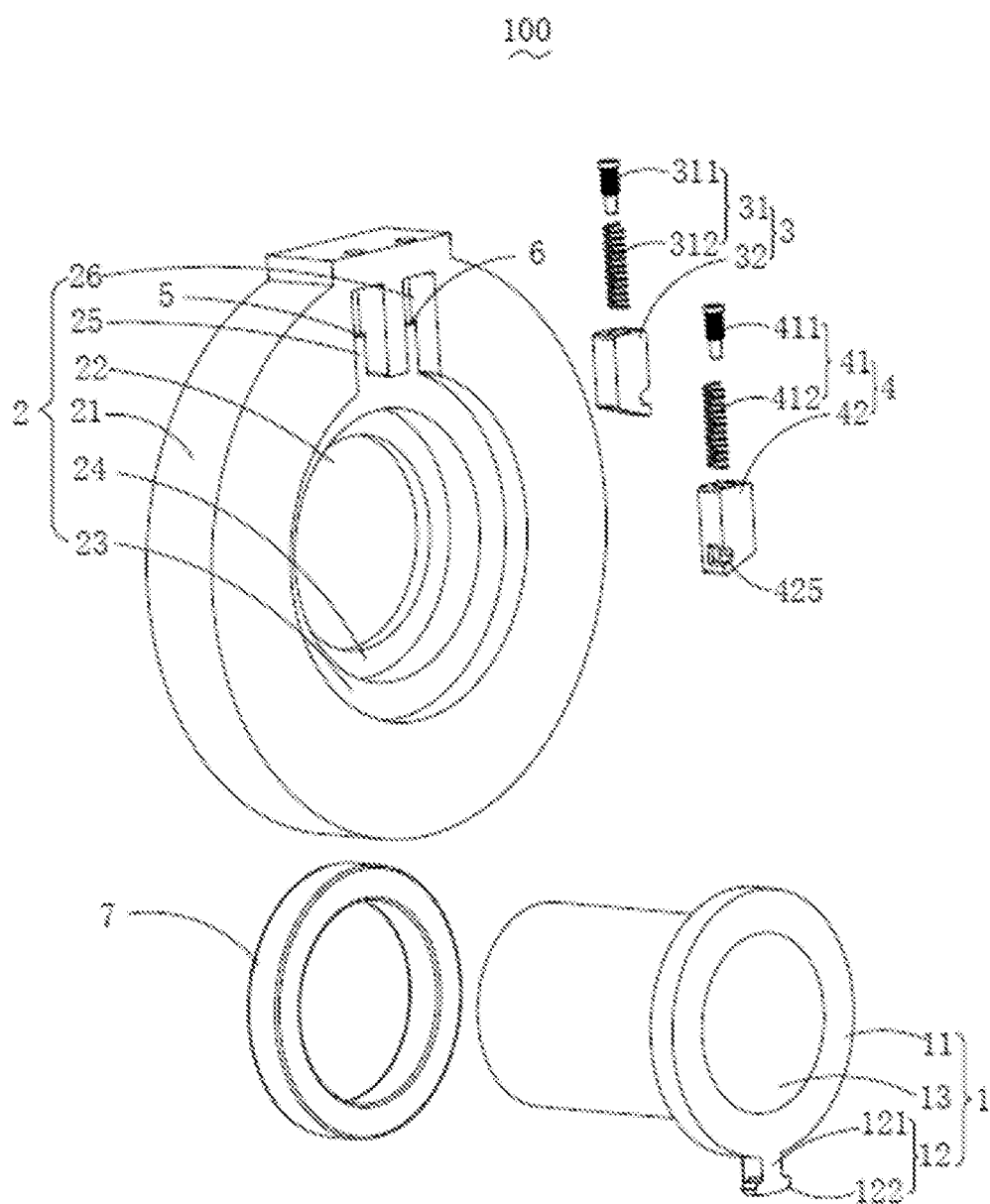
FIG. 2 is an exploded view of FIG. 1.
Figure 3:
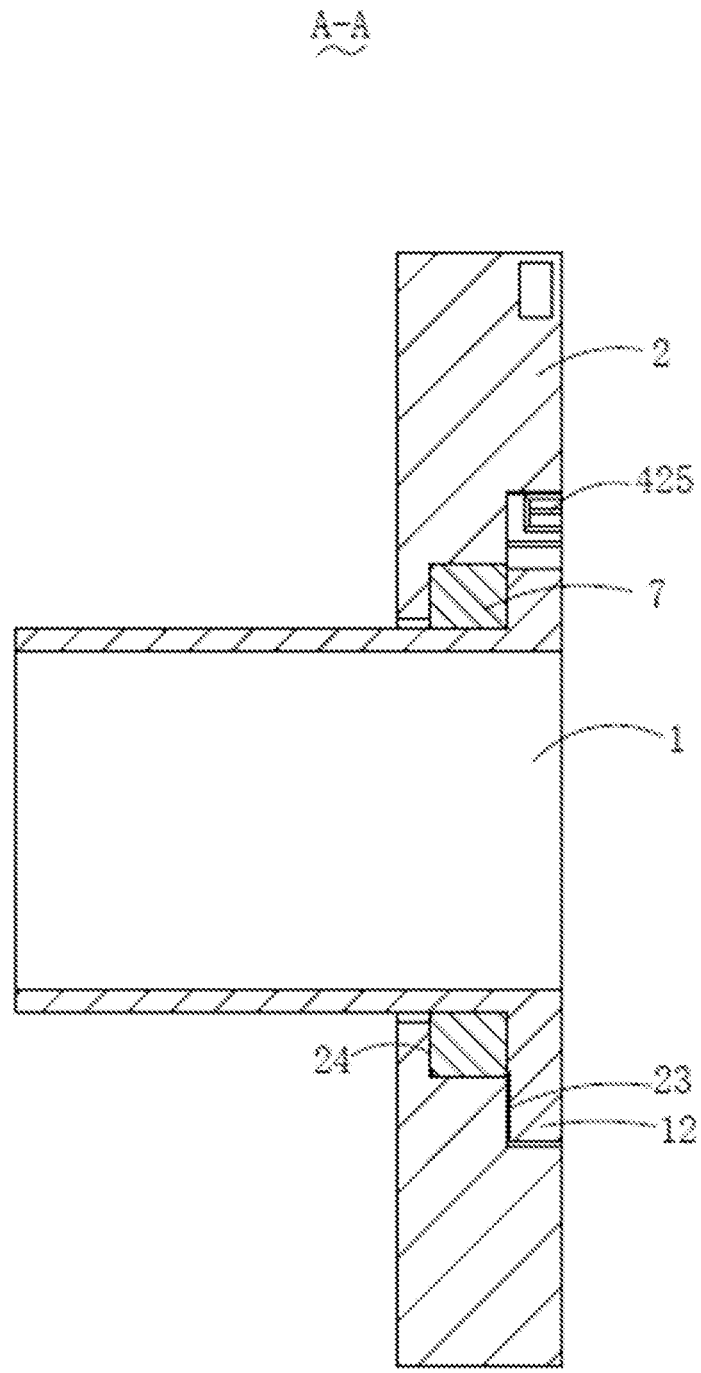
FIG. 3 is a sectional view taken along a line A-A in FIG. 1.
Figure 4:
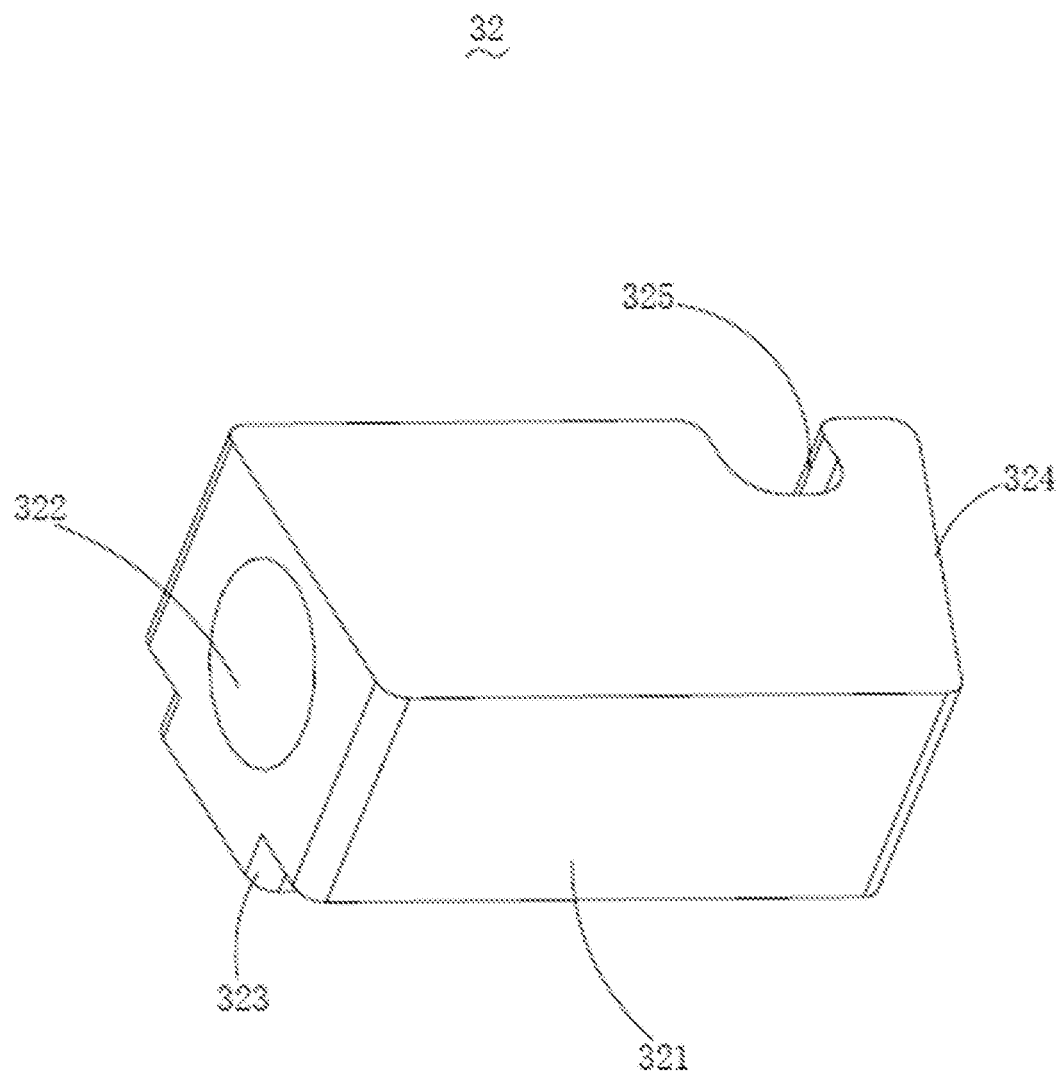
FIG. 4 is a structural schematic diagram of a first elastic block according to the present disclosure.
Figure 5:
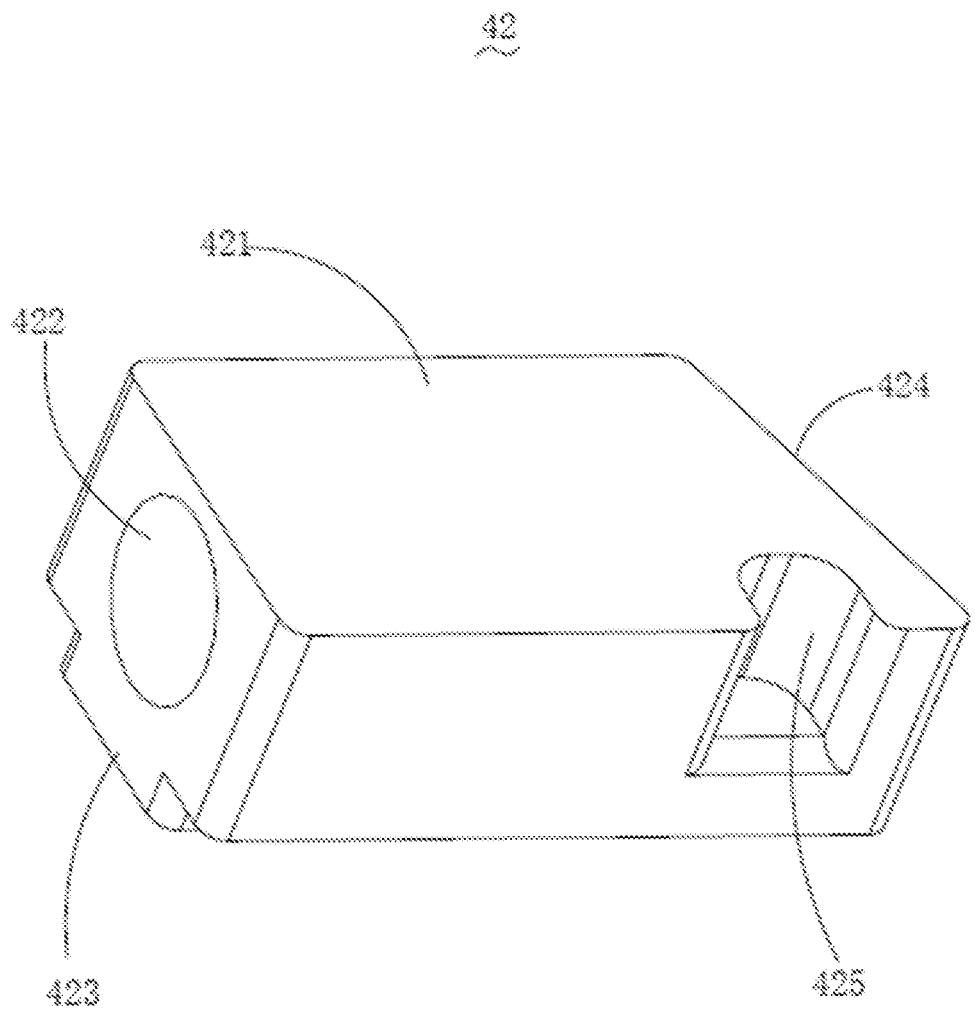
FIG. 5 is a structural schematic diagram of a second elastic block according to the present disclosure.
Figure 6:
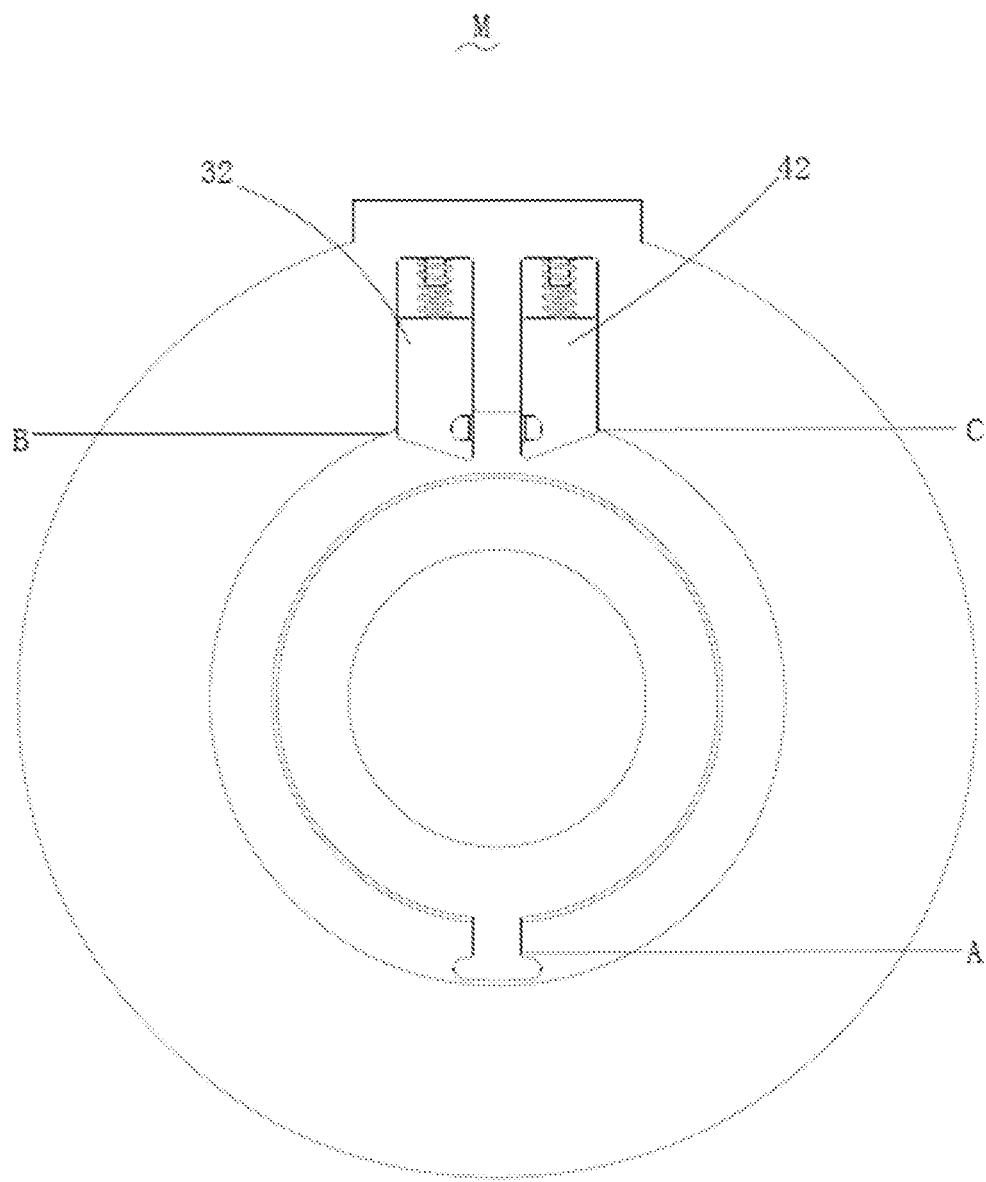
FIG. 6 is a schematic state diagram of a position M according to the present disclosure.
Figure 7:
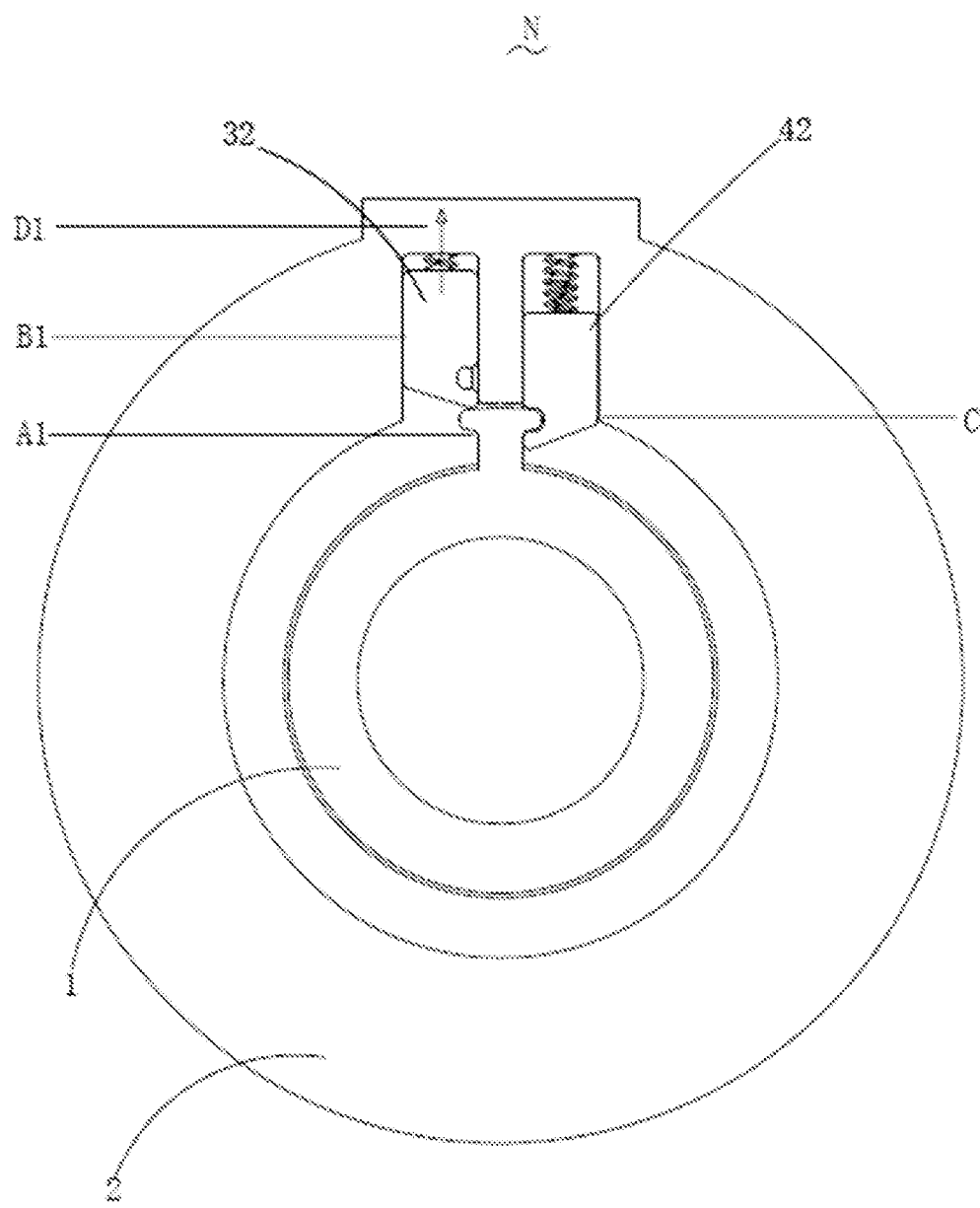
FIG. 7 is a schematic state diagram of a position N according to the present disclosure.
Figure 8:
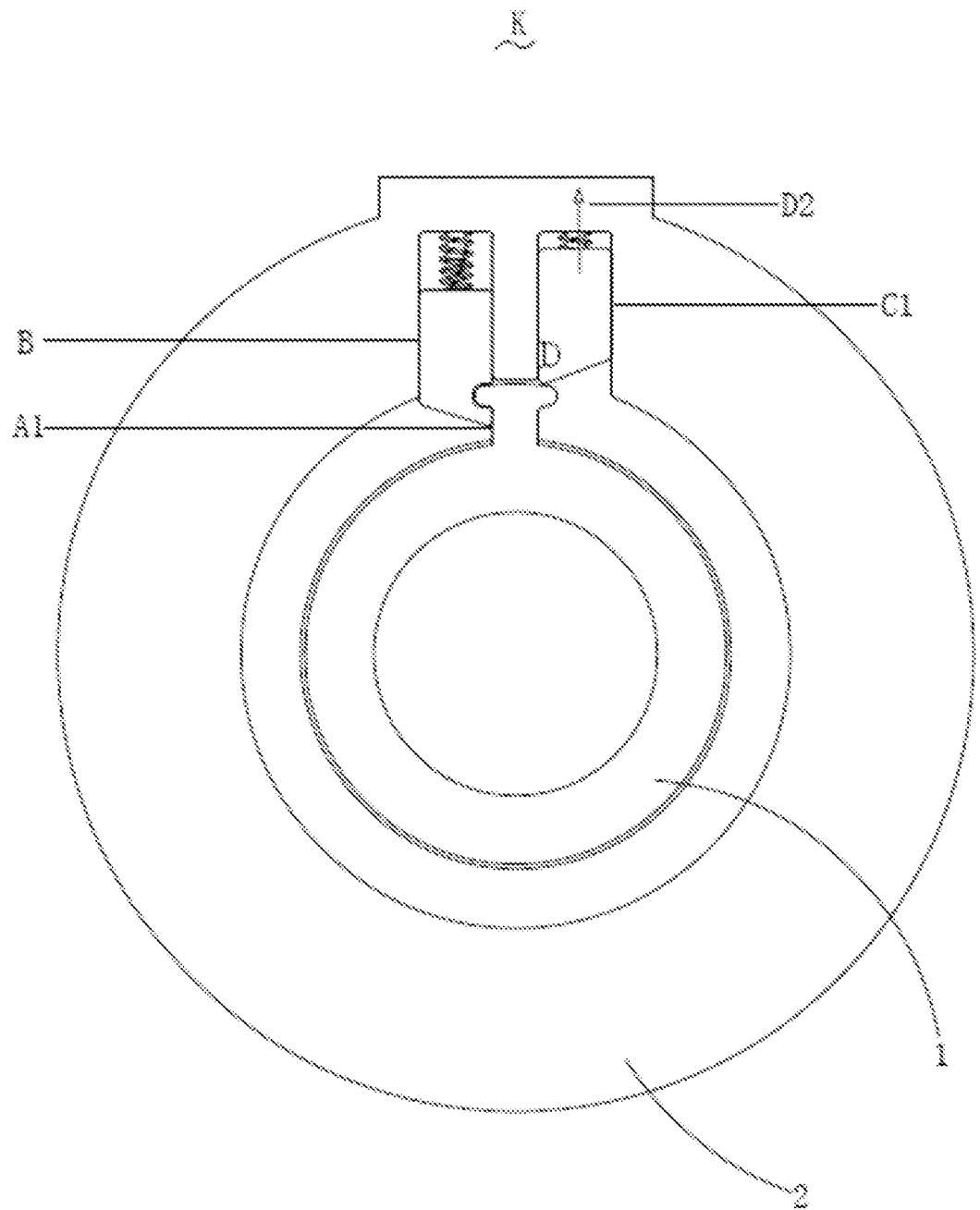
FIG. 8 is a schematic state diagram of a position K according to the present disclosure.

Referring to FIG. 1 to FIG. 8, an elastic block limiting mechanism 100 is provided, for realizing limiting of 180° forward and reverse rotation. The elastic block limiting mechanism 100 includes: a base 2, a first elastic limiting assembly 3, a second elastic limiting assembly 4, a turntable 1, and a bearing 7.

The base 2 is configured to mount the first elastic limiting assembly 3, the second elastic limiting assembly 4, the turntable 1, and the bearing 7. The base 2 includes a base body 21 and a through hole 22 passing through the base body 21.

The base 2 further includes a first groove 23 and a second groove 24 that are recessed from one side of the base body 21 along an axial direction of the through hole 22 and ring-shaped, and a first guide groove 25 and a second guide groove 26 that are recessed from one side of the base body 21. The turntable 1 includes a turntable body 11 and a shifting lever 12 formed by protruding from the turntable body 11. The turntable body 11 passes through the through hole 22 an forms a rotational connection with the second groove 24. The shifting lever 12 is arranged in the first groove 23. Therefore, the turntable 1 as a whole is assembled with the base 2. The structure is smaller, and rotation stability is higher, saving a mounting space.

The first elastic limiting assembly 3 is arranged in the first guide groove 25. The first elastic limiting assembly 3 includes a first elastic member 31 fixed to one side of the base 2 and extending along a direction parallel to a radial direction of the through hole 22 and a first elastic block 32 fixedly connected to an end of the first elastic member 31 adjacent to the through hole 22. The first elastic block 32 is elastically adjusted by the first elastic member 31 to slide back and forth in the first guide groove 25. The first elastic block 32 includes a first elastic block body 321, a first guide hole 322 recessed from an end of the first elastic block body 321 away from the through hole 22, and a first concave structure 325 recessed from one side of the first elastic block body 321. The other end of the first elastic block body 321 adjacent to the through hole 22 is a first sliding slope 324. The first guide hole 322 cooperates with the first elastic member 31 to provide an operating path and attitude control for the first elastic member 31, improving elastic operation efficiency of the first elastic member 31.

The second elastic limiting assembly 4 is arranged parallel to and apart from the first elastic limiting assembly 3, the second elastic limiting assembly 4 includes a second elastic member 41 fixed to one side of the base 2 and extending along a direction parallel to the first elastic member 31 and a second elastic block 42 fixedly connected to an end of the second elastic member 41 adjacent to the through hole 22. The second elastic block 42 includes a second elastic block body 421, a second guide hole 422 recessed from an end of the second elastic block body 421 away from the through hole 22, and a second concave structure 425 recessed from one side of the second elastic block body 421. The other end of the second elastic block body 421 adjacent to the through hole 22 is a second sliding slope 424. The first concave structure 325 and the second concave structure 425 are respectively located on sides of the first elastic block body 321 and the second elastic block body 421 adjacent to each other and arranged opposite to each other. Sides of the first sliding slope 324 and the second sliding slope 424 adjacent to each other are closer to the through hole 22 than sides of the first sliding slope 324 and the second sliding slope 424 away from each other.

The bearing 7 is mounted in the through hole 22 and fixed to the base body 21, and the turntable body 11 is inserted into the bearing 7 and forms a fixation to achieve a rotational connection with the base body 21. Friction between the turntable 1 and the base 2 can be reduced through the bearing 7, and the turntable 1 has a better rotation effect.

The shifting lever 12 rotates clockwise or counterclockwise to the first sliding slope 324 or the second sliding slope 424 until the first elastic block body 321 or the second elastic block body 421 is abutted against so that the shifting lever 12 slides into the second concave structure 425 or the first concave structure 325 to realize snapped limiting. The shifting lever 12 is slid into the second concave structure 425 and the first concave structure 325 respectively through the first sliding slope 324 and the second sliding slope 424 to achieve mutual engagement or disengagement. When the turntable 1 rotates forward, the shifting lever 12 slides through the first sliding slope 324 into the second concave structure 425 of the second elastic block 42 to realize engaged limiting, and when the turntable 1 rotates reversely, the shifting lever 12 slides into the first concave structure 325 of the first elastic block 32 through the second sliding slope 424 to realize engaged limiting, so as to realize rotation positioning of 180° forward and reverse rotation. An overall footprint is small, and the spring can effectively restrict a degree of freedom of the elastic block in a non-operating state in a vibration environment, which prevents shaking, effectively reduces noise, and has high reliability.

In this embodiment, the first elastic member 31 further includes a first limiting block 323 protruding from a bottom side of the first elastic block body 321 adjacent to the base 2. The second elastic member further includes a second limiting block 423 protruding from a bottom side of the second elastic block body 421 adjacent to the base 2.

The first guide groove 25 is inward recessed to form a first limiting stage 5, the second guide groove 26 is inward recessed to form a second limiting stage 6, the first limiting block 323 is arranged in contact with the first limiting stage 5, and the second limiting block 423 is arranged in contact with the second limiting stage 6. Therefore, stability is higher in overall abutment.

The first guide groove 25 is inward recessed to form the first limiting stage 5, the second guide groove 26 is inward recessed to form the second limiting stage 6, the first limiting block 323 is arranged in contact with the first limiting stage 5, and the second limiting block 423 is arranged in contact with the second limiting stage 6. The shifting lever 12 is slid into the second concave structure 425 and the first concave structure 325 respectively through the first sliding slope 324 and the second sliding slope 424 to achieve mutual engagement or disengagement. The first elastic member 31 and the second elastic member 41 abut the first elastic block 32 and the second elastic block 42 into the first guide groove 25 and the second guide groove 26 respectively. The first limiting block 323 of the first elastic block 32 is in contact with the first limiting stage 5 to control an initial position of the first elastic block 32 in the first guide groove 25, which effectively prevents loss of rotational efficiency caused by wear generated due to contact between the first elastic block 32 and the turntable 1. The second limiting block 423 of the second elastic block 42 is in contact with the second limiting stage 6 to control an initial position of the second elastic block 42 in the second guide groove 26, which effectively prevents contact between the second elastic block 42 and the turntable 1.

In this embodiment, the shifting lever 12 includes a shifting lever body 121 protruding from the turntable body and a convex structure 122 extending from an end of the shifting lever body 121 away from the turntable body 11 to two opposite sides and perpendicular to the shifting lever body 121. The convex structure 122 is configured to abut against the first sliding slope 324 or the second sliding slope 424 and slide to snap into and limit the second concave structure 425 or the first concave structure 325. The convex structure 122 and the first concave structure 325 or the second concave structure 425 are mutually engaged and locked. Through a convex structure feature of the shifting lever 12 and a concave structure feature of the elastic block, they can be engaged with each other during operation, and disengaged from each other when the operation ends, bringing a good positioning effect and making the operation convenient.

In this embodiment, two ends of the convex structure are recessed to form a cambered structure, and the cambered structure is in contact with the first sliding slope 324 or the second sliding slope 424 to convert rotational motion into linear motion.

In this embodiment, the first sliding slope 324, the second sliding slope 424, and the cambered structure are formed by surface treatment through a coating process. Optionally, the coating process is a diamond-like carbon (DLC) surface treatment process, which can effectively improve hardness and wear resistance and reduce a friction coefficient, thereby improving sliding performance and preventing seizure.

In this embodiment, the first elastic member 31 includes a first guide post 311 fixed to the base 2 and a first spring 312 sleeved on the first guide post 311 and having one end fixed to the base 2, and the other end of the first spring 312 is inserted and extended into the first guide hole 322 and forms a fixed connection. The first spring 312 is always in a compressed state, so that the initial position of the first elastic block 32 can be controlled, and the other end of the first spring 312 is arranged in the first guide hole 322, which can prevent shaking, reduce noise, and also prevent wear generated due to contact between a first slider and the turntable 1.

In this embodiment, the second elastic member 41 includes a second guide post 411 fixed to the base 2 and a second spring 412 sleeved on the second guide post 411 and having one end fixed to the base 2, and the other end of the second spring 412 is inserted and extended into the second guide hole 422 and forms a fixed connection. The second spring 412 is always in a compressed state, so that the initial position of the second elastic block 42 can be controlled, and the other end of the second spring 412 is arranged in the second guide hole 422, which can prevent shaking, reduce noise, and also prevent wear generated due to contact between a second slider and the turntable 1.

In this embodiment, both the first guide post 311 and the second guide post 411 are screws. It is convenient to connect and disassemble the screws.

In this embodiment, the turntable body 11 penetrates inward to form a middle hole 13, and the middle hole 13 is configured to mount a wiring harness. The middle hole 13 of the turntable 1 facilitates the wiring harness to pass through, and +180° rotation can prevent excessive twisting of the wiring harness and bring high security.

An operating principle of the elastic block limiting mechanism 100 of the present disclosure is as follows.

Rotation requirements of a robot turntable 1: position M→position N→position M→position K→position M. The position M is a zero position. The position N is a position of 180° forward rotation. The position K is a position of 180° reverse rotation.

1. Position M: the robot turntable 1 is at an initial position, the shifting lever 12 of the turntable 1 is at a point A, the first elastic block 32 is at a point B, and the second elastic block 42 is at a point C.

2. Position M→position N: during 180° forward rotation of the robot turntable 1, under the action of the shifting lever 12, the first elastic block 32 moves from a position B to a position B1 along a direction D1 shown in the figure, an arc surface of the shifting lever 12 limits the first elastic block 32 to the position B1, a boss of the shifting lever 12 is engaged with a pit of the second elastic block 42, and the second elastic block 42 is still at a position C, which limits further forward rotation of the turntable 1, causes the shifting lever 12 of the turntable 1 to be at a position A1, and realizes limiting of 180° forward rotation of the robot turntable 1.

3. Position N→position M: the robot turntable 1 rotates reversely and returns to a zero point, the boss of the shifting lever 12 is disengaged from the pit of the second elastic block 42 and returns to a position A from the position A1, and the position of the second elastic block 42 remains unchanged, which is still at the position C, and the first elastic block 32 slides along an opposite direction of D1 under the action of the spring and returns from B1 to the position B, realizing a position constraint on the elastic block.

4. Position M→position K: during 180° reverse rotation of the robot turntable 1, under the action of the shifting lever 12, the second elastic block 42 moves from the position C to a position C1 along a direction D2 shown in the figure, the arc surface of the shifting lever 12 limits the second elastic block 42 to the position C1, the boss of the shifting lever 12 is engaged with a pit of the first elastic block 32, and the first elastic block 32 is still at the position B, which limits further reverse rotation of the turntable 1, causes the shifting lever 12 of the turntable 1 to be at the position A1, and realizes limiting of 180° reverse rotation of the robot turntable 1.

5. Position K→position M: the robot turntable 1 rotates forward and returns to a zero point, the boss of the shifting lever 12 is disengaged from the pit of the first elastic block 32 and returns to the position A from the position A1, and the position of the first elastic block 32 remains unchanged, which is still at the position B, and the second elastic block 42 slides along an opposite direction of D2 under the action of the spring and returns from C1 to the position C, realizing a position constraint on the elastic block.

Compared with the related art, in the elastic block limiting mechanism of the present disclosure, the base is provided, the first elastic limiting assembly and the second elastic limiting assembly are installed on the base to limit a rotation position of the turntable, the first elastic block is adjusted by the first elastic member of the first elastic limiting assembly, and the second elastic block is adjusted by the second elastic member of the second elastic limiting assembly. When the turntable rotates forward, the shifting lever slides through the first sliding slope into the second concave structure of the second elastic block to realize engaged limiting, and when the turntable rotates reversely, the shifting lever slides into the first concave structure of the first elastic block through the second sliding slope to realize engaged limiting, so as to realize rotation positioning of 180° forward and reverse rotation. An overall footprint is small, and the spring can effectively restrict a degree of freedom of the elastic block in a non-operating state in a vibration environment, which prevents shaking, effectively reduces noise, and has high reliability.

The above description is only embodiments of the present disclosure. It should be pointed out herein that, for those of ordinary skill in the art, improvements can also be made without departing from the creative concept of the present disclosure, all of which fall within the protection scope of the present disclosure.

What is claimed is:

1. An elastic block limiting mechanism for realizing limiting of 180° forward and reverse rotation, comprising:
   a base, the base comprising a base body and a through hole in a circular shape passing through the base body;
   a first elastic limiting assembly, wherein the first elastic limiting assembly comprises a first elastic member fixed to one side of the base and extending along a direction parallel to a radial direction of the through hole and a first elastic block fixedly connected to an end of the first elastic member adjacent to the through hole; the first elastic block comprises a first elastic block body, a first guide hole recessed from an end of the first elastic block body away from the through hole, and a first concave structure recessed from one side of the first elastic block body; the other end of the first elastic block body adjacent to the through hole is a first sliding slope;
   a second elastic limiting assembly arranged parallel to and spaced apart from the first elastic limiting assembly, wherein the second elastic limiting assembly comprises a second elastic member fixed to one side of the base and extending along a direction parallel to the first elastic member and a second elastic block fixedly connected to an end of the second elastic member adjacent to the through hole; the second elastic block comprises a second elastic block body, a second guide hole recessed from an end of the second elastic block body away from the through hole, and a second concave structure recessed from one side of the second elastic block body, the other end of the second elastic block body adjacent to the through hole is a second sliding slope; the first concave structure and the second concave structure are respectively located on sides of the first elastic block body and the second elastic block body adjacent to each other and arranged opposite to each other; and sides of the first sliding slope and the second sliding slope adjacent to each other is closer to the through hole than sides of the first sliding slope and the second sliding slope away from each other;
   a turntable comprising a turntable body in a ring shape and a shifting lever protruding from the turntable body; and
   a bearing mounted in the through hole and fixed to the base body, wherein the turntable body is inserted into and fixed to the bearing to achieve a rotational connection with the base body;
   wherein the shifting lever rotates clockwise or counterclockwise to the first sliding slope or the second sliding slope until abuts against the first elastic block body or the second elastic block body so that the shifting lever slides into the second concave structure or the first concave structure to realize snapped connection.

2. The elastic block limiting mechanism according to claim 1, wherein the base further comprises a first groove in a ring shape and a second groove in a ring shape that are recessed from one side of the base body along an axial direction of the through hole, and a first guide groove and a second guide groove that are recessed from one side of the base body along a radial direction of the through hole; and the turntable body passes through the through hole and forms a rotational connection with the second groove, and the shifting lever is arranged in the first groove.

3. The elastic block limiting mechanism according to claim 2, wherein the first elastic member further comprises a first limiting block protruding from a bottom side of the first elastic block body adjacent to the base; and the second elastic member further comprises a second limiting block protruding from a bottom side of the second elastic block body adjacent to the base; and the first guide groove is inward recessed to form a first limiting stage, the second guide groove is inward recessed to form a second limiting stage, the first limiting block is arranged in contact with the first limiting stage, and the second limiting block is arranged in contact with the second limiting stage.

4. The elastic block limiting mechanism according to claim 1, wherein the shifting lever comprises a shifting lever body protruding from the turntable body and a convex structure extending from an end of the shifting lever body away from the turntable body to two opposite sides and perpendicular to the shifting lever body, and the convex structure is configured to abut against the first sliding slope or the second sliding slope and slide to realize a snapped connection with the second concave structure or the first concave structure.

5. The elastic block limiting mechanism according to claim 4, wherein two ends of the convex structure are recessed to form a cambered structure, and the cambered structure is in contact with the first sliding slope or the second sliding slope to convert rotational motion into linear motion.

6. The elastic block limiting mechanism according to claim 1, wherein the first elastic member comprises a first guide post fixed to the base and a first spring sleeved on the first guide post, and the first spring has one end fixed to the base, and the other end inserted and extended into the first guide hole to form a fixed connection.

7. The elastic block limiting mechanism according to claim 6, wherein the second elastic member comprises a second guide post fixed to the base and a second spring sleeved on the second guide post, and the second spring has one end fixed to the base, and the other end inserted and extended into the second guide hole to form a fixed connection.

8. The elastic block limiting mechanism according to claim 7, wherein both the first guide post and the second guide post are screws.

9. The elastic block limiting mechanism according to claim 1, wherein the turntable body penetrates inward to form a middle hole, and the middle hole is configured to mount a wiring harness.

\* \* \* \* \*